United States Patent
Chandraker et al.

(10) Patent No.: US 8,401,241 B2
(45) Date of Patent: Mar. 19, 2013

(54) STRUCTURE AND MOTION WITH STEREO USING LINES

(75) Inventors: Manmohan Chandraker, La Jolla, CA (US); Jongwoo Lim, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 910 days.

(21) Appl. No.: 12/506,560

(22) Filed: Jul. 21, 2009

(65) Prior Publication Data

US 2010/0098293 A1 Apr. 22, 2010

Related U.S. Application Data

(60) Provisional application No. 61/196,411, filed on Oct. 17, 2008.

(51) Int. Cl.
*G06K 9/00* (2006.01)
(52) U.S. Cl. ........ 382/107; 382/103; 382/154; 382/181; 382/199; 382/291; 348/135; 348/143; 348/148; 345/419; 345/420; 345/427; 345/634
(58) Field of Classification Search .................. None
See application file for complete search history.

(56) References Cited

U.S. PATENT DOCUMENTS

| | | | |
|---|---|---|---|
| 5,598,515 A | | 1/1997 | Shashua |
| 6,137,893 A * | | 10/2000 | Michael et al. ............... 382/103 |
| 6,192,145 B1 | | 2/2001 | Anandan et al. |
| 6,859,549 B1 | | 2/2005 | Oliensis |
| 6,999,612 B1 | | 2/2006 | Oliensis |
| 2002/0118873 A1 * | | 8/2002 | Tran et al. ..................... 382/143 |
| 2002/0118874 A1 * | | 8/2002 | Chung et al. .................. 382/154 |
| 2003/0058945 A1 | | 3/2003 | Chiba et al. |
| 2005/0140670 A1 * | | 6/2005 | Wu et al. ........................ 345/419 |
| 2006/0058974 A1 * | | 3/2006 | Lasiuk et al. .................. 702/97 |
| 2008/0152192 A1 | | 6/2008 | Zhu et al. |
| 2008/0310757 A1 * | | 12/2008 | Wolberg et al. ............... 382/285 |

FOREIGN PATENT DOCUMENTS

WO   WO 98/18117   4/1998

OTHER PUBLICATIONS

Bartoli et al., "The 3D Line Motion Matrix and Alignment of Line Reconstructions", 2004, International Journal of Computer Vision 57(3), 159-178.*
Dehili et al,. "Parallel Hough transform on hyper-pyramid architecture: a divide and conquer approach," Image Processing, Sep. 1996. Proceedings., International Conference on , vol. 1, no., pp. 125-128 vol. 2, 16-19.*
Kriegman, "Assignment #3 : Dense Stereo Matching", Winter 2007, University of California, San Diego, CSE 252A.*

(Continued)

*Primary Examiner* — Matthew Bella
*Assistant Examiner* — Jason Heidemann
(74) *Attorney, Agent, or Firm* — Fenwick & West LLP; Mark E. Duell

(57) ABSTRACT

A system and method are disclosed for estimating camera motion and structure reconstruction of a scene using lines. The system includes a line detection module, a line correspondence module, a temporal line tracking module and structure and motion module. The line detection module is configured to detect lines in visual input data comprising a plurality of image frames. The line correspondence module is configured to find line correspondence between detected lines in the visual input data. The temporal line tracking module is configured to track the detected lines temporally across the plurality of the image frames. The structure and motion module is configured to estimate the camera motion using the detected lines in the visual input data and to reconstruct three-dimensional lines from the estimated camera motion.

20 Claims, 14 Drawing Sheets

OTHER PUBLICATIONS

Bouguet, "Pyramidal Implementation of the Lucas Kanade Feature Tracker Description of the algorithm", 2000, Intel Corporation Microprocessor Research Labs.*

Bartoli, A. et al., "Structure-From-Motion Using Lines: Representation, Triangulation and Bundle Adjustment," Dec. 2005, Computer Vision and Image Understanding, vol. 100, No. 3, pp. 416-441.

Fitzgibbon, A. et al., "Automatic 3D Model Acquisition and Generation of New Images from Video Sequences," Dept. of Engineering Science, University of Oxford, United Kingdom, 8 pages, 1998.

PCT International Search Report and Written Opinion, PCT Application No. PCT/US2009/051306, Sep. 30, 2009, 7 pages.

Taylor, C. et al., "Structure and Motion from Line Segments in Multiple Images," IEEE Transactions on Pattern Analysis and Machine Intelligence, Nov. 1995, vol. 17, No. 11, pp. 1021-1032.

Zhang, Z., "Estimating Motion and Structure from Correspondences of Line Segments Between Two Perspective Images," INRIA Research Report No. 2340, 1994, 25 pages.

* cited by examiner

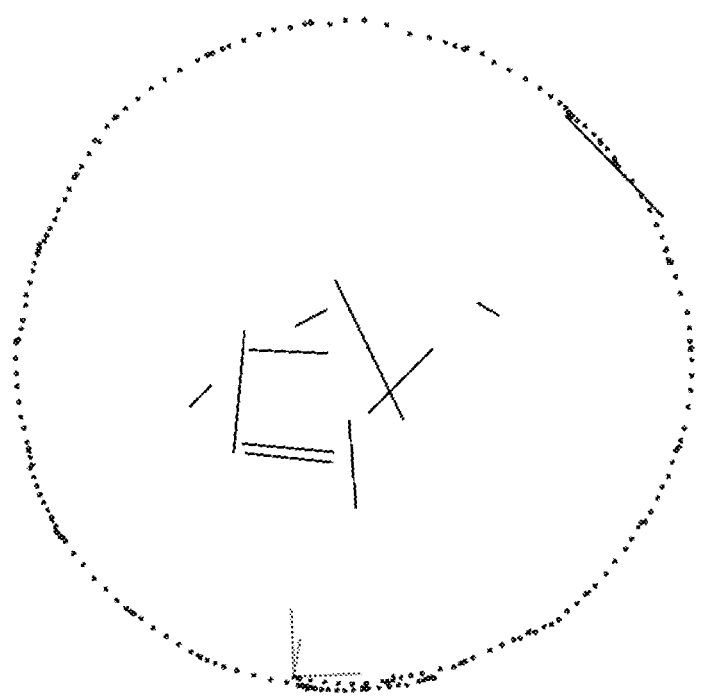
Figure 8B: Top-view
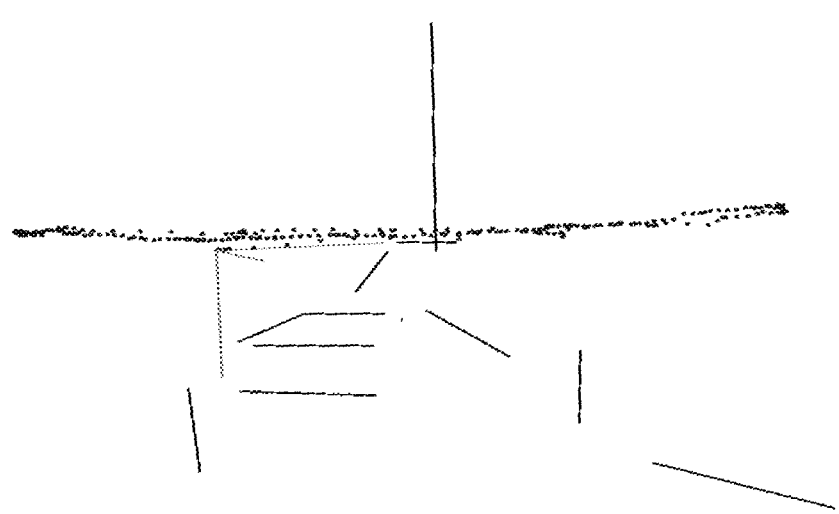
Figure 8B: Side-view

Top-view

Side-view

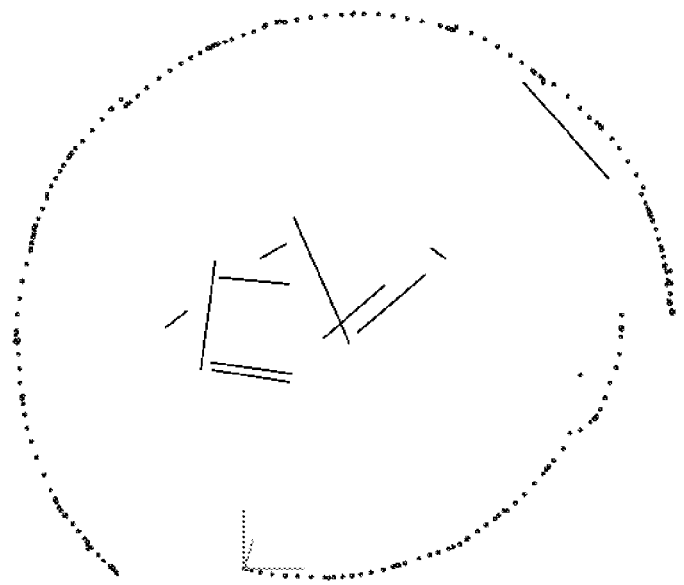
Figure 8D: Top-view
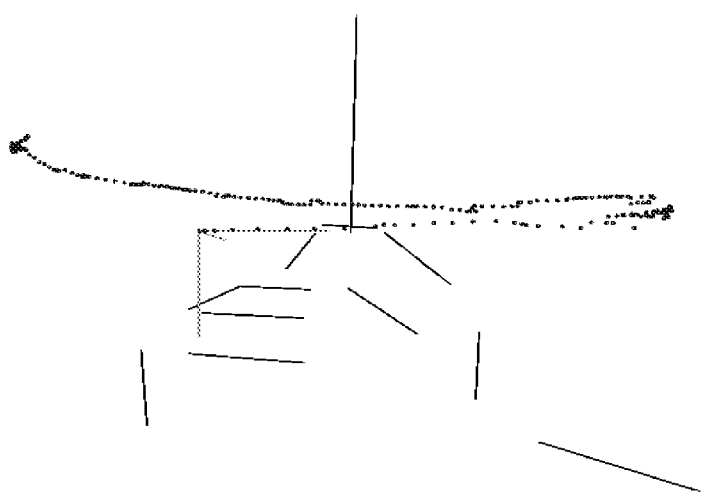
Figure 8D: Side-view

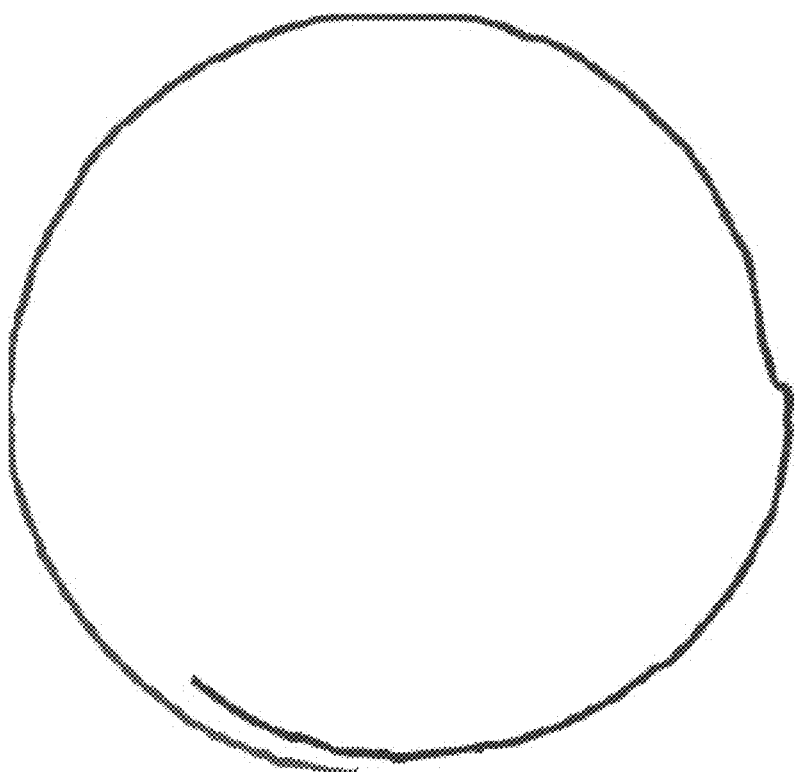
Figure 8E: Top-view
Figure 8E: Side-view

STRUCTURE AND MOTION WITH STEREO USING LINES

CROSS-REFERENCE TO RELATED APPLICATION

This application claims priority from U.S. Patent Application No. 61/196,411, entitled "Structure and Motion with Stereo Using Lines", filed on Oct. 17, 2008, which is hereby incorporated by reference in its entirety.

FIELD OF THE INVENTION

The present invention relates generally to estimating motion and structures of a video scene, and in particular to estimating motion and structure of a video scene using a stereo pair of cameras with straight lines.

BACKGROUND OF THE INVENTION

Estimation of the structure of a scene and the motion of a camera rig using only visual input data has been an important problem in computer vision research. Structure and motion (also called structure from motion) is the problem of reconstructing the geometry of a scene from a stream of images based on the estimation of camera motion. Conventional systems rely on using finite points or line segments for structure and motion estimation. However, structure and motion estimation based on finite line segments has the drawback that limits the quality of three-dimensional (3D) structure reconstruction due to unreliable determination of the points or end points of the line segments. In the worst case scenario, such as a cluttered environment where lines are often occluded, the end points may be false corners or unstable T-junctions. The unreliable determination of the end points of the occluded line segments often leads to poor quality of 3D structure reconstruction from line correspondences across multiple views.

A variation of structure and motion estimation based on finite line segments tries to minimize reprojection error in the image plane for variable end points across views. However, the cost function associated with the method can be optimized only by iterative local minimization which requires initialization and is not amendable to a real-time implementation. Similarly, existing line-based systems for structure and motion compensation are not optimized for real-time implementation.

Multifocal tensors are another commonly used approach for structure and motion estimation from several line correspondences. However, this approach involves extensive book-keeping to enforce non-linear dependencies within tensor indices. Further, this approach uses a large number of line correspondences to produce a linear estimate, which can be arbitrarily far from a rigid-body motion in the presence of noise. Thus, multifocal tensors approach is too cumbersome for estimating even a 6-degree-of-freedom (dof) motion between two calibrated stereo pairs.

SUMMARY OF THE INVENTION

To provide fast and robust motion estimation and structure reconstruction, a structure and motion system exploits the known camera parameters of a stereo pair with straight lines. The term "a straight line" refers to a digital representation of a line in a digital representation of an image. The term "straight line" and the term "line" are used interchangeably from herein and throughout the entire specification. By using lines rather than line segments, the structure and motion system avoids the issues due to uncertain determination of end points of a line segment because points between the end points of a line segment can be used in estimating camera motion. Using a few (two or three) straight lines by the structure and motion system provides a suitable structure and motion solution in real-time. The disclosed reconstruction system has a wide range application to real world problems, such as applications in robotics and automotive systems.

One embodiment of a disclosed system (and method) includes estimating camera motion and structure reconstruction of a scene using straight lines. The system includes a line detection module, a line correspondence module, a temporal line tracking module and structure and motion module. The line detection module is configured to detect lines in visual input data comprising a plurality of image frames. The line correspondence module is configured to find line correspondence between detected lines in different views. The temporal line tracking module is configured to track the detected lines temporally across the plurality of the image frames. The structure and motion module is configured to estimate the camera motion using the detected lines in the visual input data and to reconstruct three-dimensional lines and the estimated camera motion.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIGS. 8A-8F illustrate structure and motion estimation experimental results for a turntable video sequence according to one embodiment of the invention.

DETAILED DESCRIPTION OF THE INVENTION

Figure 1:
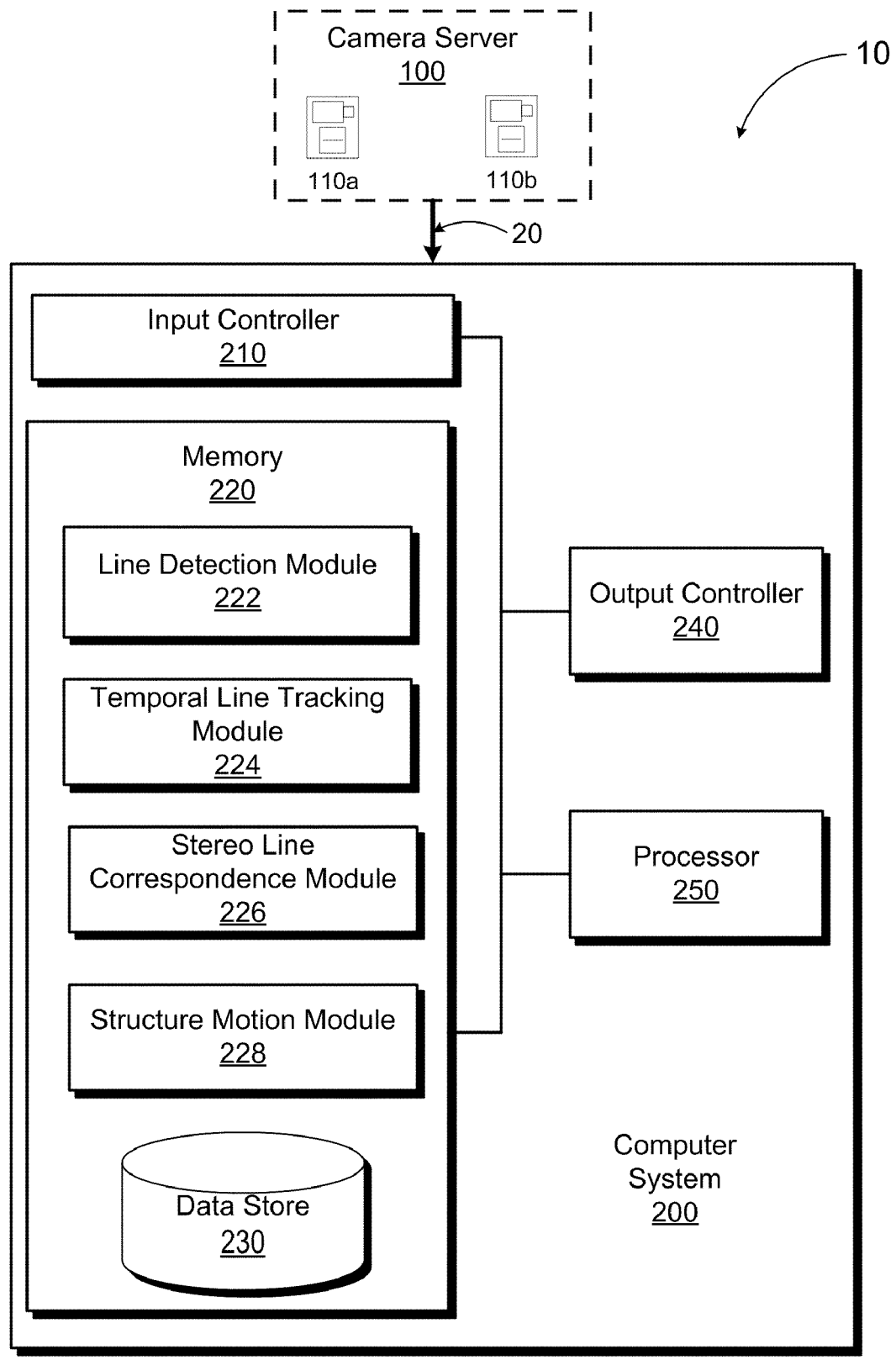
FIG. 1 illustrates a structure-motion system for structure and motion estimation according to one embodiment of the invention.

An embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

System Overview

FIG. 1 illustrates a structure-motion system 10 for structure and motion estimation according to one embodiment of the invention. The structure-motion system 10 comprises a camera server 100 and a computer system 200 having computer modules for structure and motion estimation. The camera server 100 and the computer system 200 are communicatively coupled with each other through a communication line 20.

In one embodiment, the camera server 100 comprises a stereo pair of calibrated cameras 110a-b. The camera server 100 calibrates the stereo pair of the cameras 110a-b and provides visual input data to the computer system 200. The calibrated cameras 110a-b captures the visual input data of a video sequence of synthetic data or real-world data. "Calibrated cameras" from herein means that the internal parameters and external parameters between a stereo pair of cameras are known. The internal parameters of a camera, such as camera focal length, optical center location, skewness of image pixels, and radial distortion of the lens, are often called intrinsic camera parameters. The external parameters of a camera define the location and orientation of a camera with respect to a stereo rig. The external parameters of a camera are often called extrinsic camera parameters. Two calibrated optical systems, such as two calibrated cameras, with respect to a known reference coordinate system are related to each other by a translation matrix and a rotation matrix which map a pixel point in one optical system to a corresponding pixel point in the other optical system. Any applicable camera calibration scheme is readily available within the scope of the invention. The details of the stereo pair of the calibrated camera 110a-b are further described below with reference to FIGS. 5A-5B and FIG. 6.

In one embodiment, the computer system 200 includes a processor 250, an input controller 210, an output controller 240 and a memory 220. The memory 220 stores data and/or instructions that may be executed by the processor 250. The instructions may comprise code for performing any and/or all of the techniques described herein. Memory 220 may be a DRAM device, a static random access memory (SRAM), Flash RAM (non-volatile storage), combinations of the above, or some other memory device known in the art. The memory 220 comprises a line detection module 222, a temporal line tracking module 224, a stereo line correspondence module 226 and a structure and motion module 228.

Figure 2:
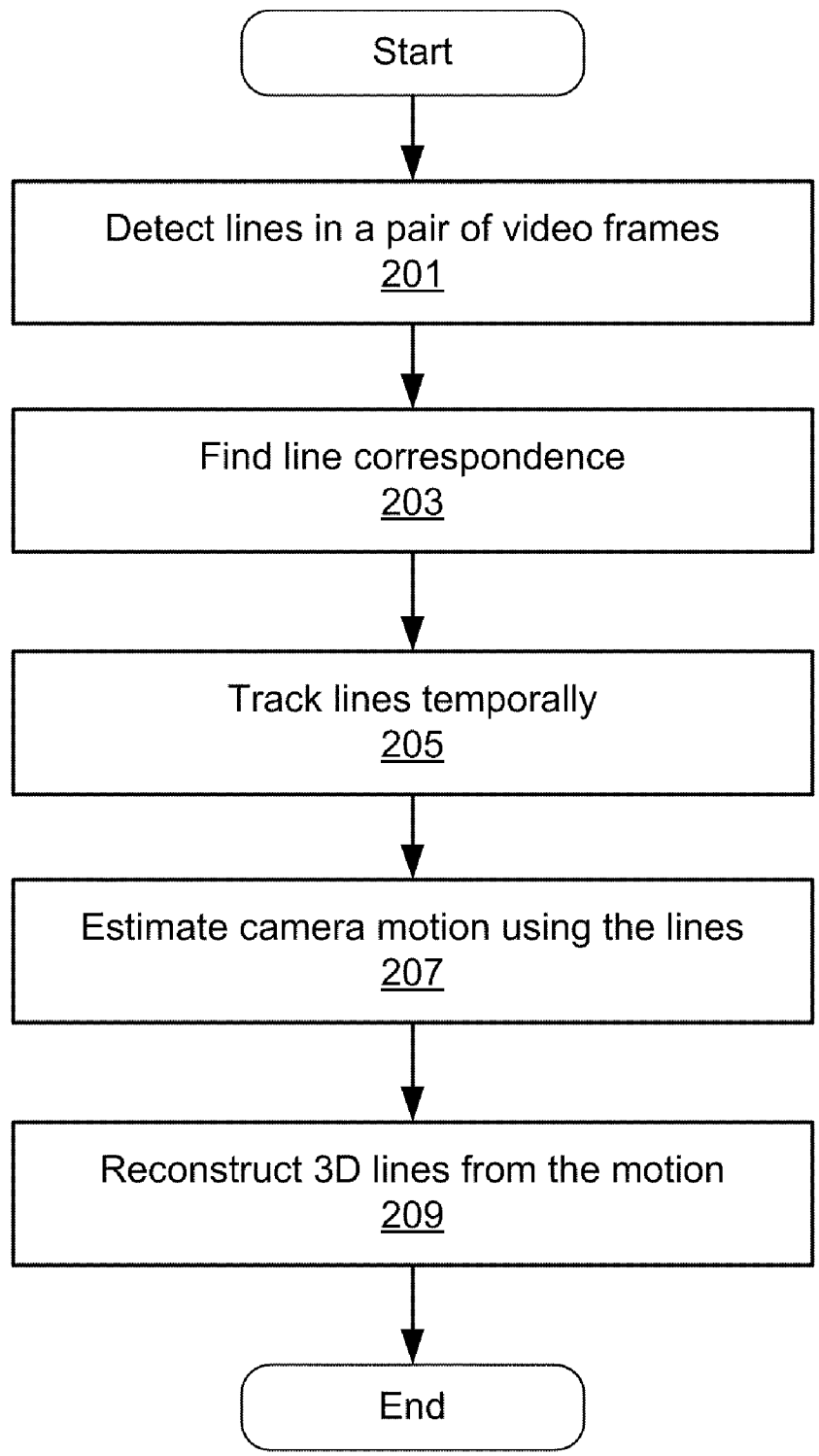
FIG. 2 is a flowchart of a structure and motion estimation method according to one embodiment of the invention.
Figure 3:
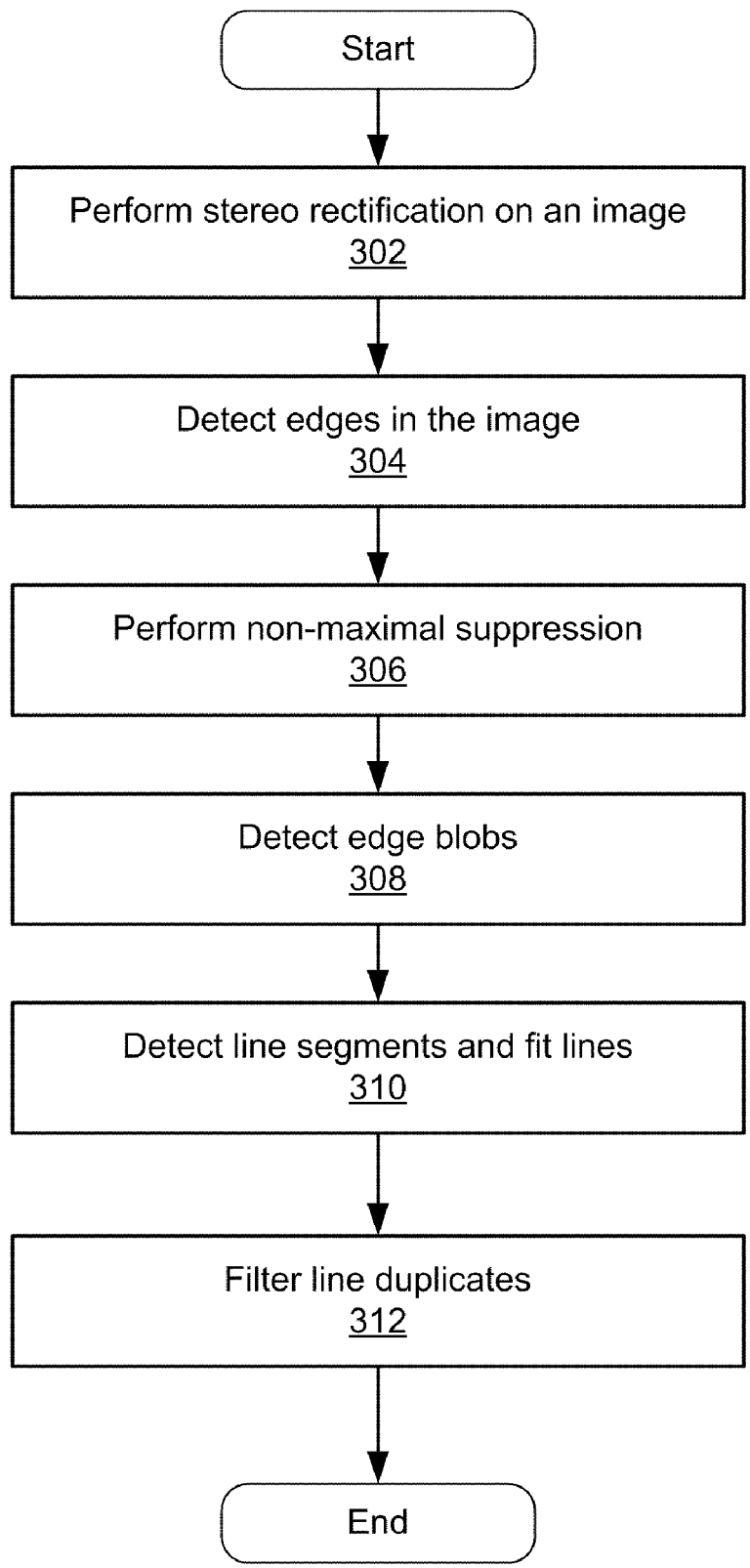
FIG. 3 is a flowchart of line detection according to one embodiment of the invention.
Figure 4:
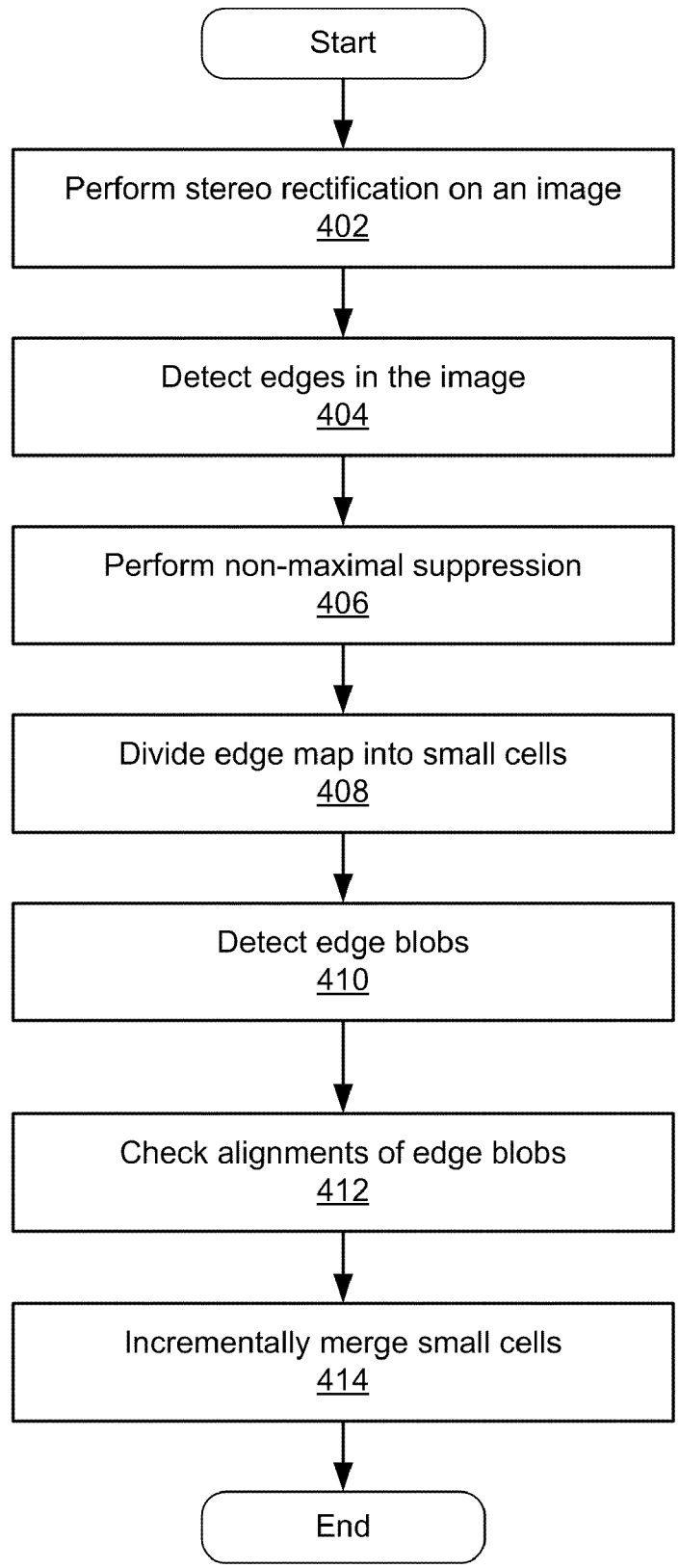
FIG. 4 is a flow chart of line detection according to anther embodiment of the invention.

The line detection module 222 comprises computer executable instructions for carrying out the line detection process described with references to FIGS. 3 and 4. The temporal line tracking module 224 comprises computer executable instructions for carrying out the temporal line tracking process described below with reference to FIG. 2. The stereo line correspondence module 226 comprises computer executable instructions for carrying out the stereo line correspondence process described below with reference to FIG. 2. The structure motion module 228 comprises computer executable instructions for estimating structure and motion of a video scene described below with reference to FIGS. 5A-5B and FIG. 6. The data store 230 stores the estimated structure and motion data of a video scene in one embodiment of the invention.

FIG. 2 is a flowchart of a structure and motion estimation method according to one embodiment of the invention. Initially, the structure-motion system 10 detects 201 lines by the line detection module 224 in a pair of video frames captured by the stereo cameras 110a-b. The line detection and tracking process is further described below with reference to, inter alia, FIG. 3 and FIG. 4.

The structure-motion system 10, through the stereo line correspondence module 226, finds 203 line correspondence for each line detected in the pair of the simultaneously captured video frames, e.g., a left frame captured by the camera 110a and a right frame by the camera 110b. In one embodiment, the stereo line correspondence module 226 uses dense stereo matching with shrinked frames and a sum-of-absolute differences measure to establish the stereo line correspondence for lines detected in a pair of captured video frames. Dense stereo matching is useful for the structure-motion system 10 to recover the detailed geometry of the video scene. Disparity between a pair of stereo images is used to measure the differences between a pixel value in a video frame (e.g., a left frame) and a co-located pixel in the corresponding video frame (e.g., a pixel in a right frame). The sum-of-absolute differences measure in conjunction with the disparity map of the pair of stereo frames/images determines whether a line in the left frame has a corresponding line in the right frame. Other embodiments may additionally use other line correspondence schemes, such as computing a "match" score for each of a plurality of lines found in the right frame for a given line in the left frame. The stereo line correspondence module 226 picks a best corresponding line in the right frame based on the match scores for the given line in the left frame.

In step 205, using the temporal line tracking module 224, the structure-motion system 10 tracks 205 lines temporally across a plurality of video frames captured at different times. In one embodiment, the temporal line tracking module 224 tracks lines from one frame to the next frame using multi-level Lucas-Kanade optical flow. Specifically, for a line l in a frame at time t, the temporal line tracking module 224 computes the entire motion fields of line l in the frame at time t and uses the motion fields to find a line l' in the next frame at time t+1. The location of line l' in the next frame at t+1 is indicated by the motion fields of the line l in the frame at time t.

In step 207, the structure and motion system 10 estimates 207 the motion of the camera 110a-b using lines detected by the line detection module 222. The structure and motion system 10 reconstructs 209 three-dimensional (3D) lines from the estimated motion. The motion estimation and line reconstruction in steps 207 and 209 are performed by the structure motion module 228 to be described in details with reference to, inter alia, FIGS. 5A-5B and FIG. 6.

To achieve accurate motion estimation and 3D structure reconstruction from motion, the structure and motion system 10 needs to detect and track lines across the video frames of a video sequence. FIG. 3 is a flowchart of line detection by the line detection module 224 according to one embodiment of the invention. Initially, the line detection module 224 performs 302 stereo rectification on images captured by the calibrated cameras 110a-b. Image rectification is a process often used in computer stereo vision to simplify the problem of finding matching points between a pair of images. Image rectification transforms the images to make the epipolar lines align horizontally, resulting in simplified correspondence search.

In step 304, the line detection module 222 detects edges in the captured image. In one embodiment, the line detection module 222 applies a Sobel edge filter to the image to generate a Sobel edge image. A Sobel edge filter uses a discrete differentiation operator to compute an approximation of the gradient of the image intensity at each pixel, giving the direction of the largest possible increase from light to dark and the rate of change in that direction. The approximation of the gradient shows how "abruptly" or "smoothly" the image changes at each pixel, and therefore how likely it is that part of the image represents an edge, as well as how that edge is likely to be oriented.

In step 306, the line detection module 222 applies non-maximal suppression to accurately locate the peak/ridge location of both strong and weak edges. In one embodiment, the following non-maximal suppression method is used to build an edge map:

$$I_x = \max_{dx} \sigma\left(\frac{S_x - (S_{x+dx} + S_{x-dx})/2}{\max((S_{x+dx} + S_{x-dx})/2, \theta_{edge})}; s, m\right)$$

where $S_x$ is the Sobel edge response at a pixel $x=(x,y)^T$;

$$\sigma(x; s, m) = \frac{1}{1 + \exp(-(x-m)/s)}$$

is a sigmoid function; $\theta_{edge}$ is a free parameter and $dx \in \{(1,0)^T, (0,1)^T, (1,1)^T, (1,-1)^T\}$ is a selected testing direction.

In step 308, the line detection module 222 detects edge blobs in the image. A blob refers to a point and/or region in the image that is either brighter or darker than its surroundings. Different blob detection schemes, such as differential methods based on derivative expressions and methods based on local extrema in the intensity landscape, can be used in the invention.

In step 310, the line detection module 222 detects line segments based on the detected line blobs and fits straight lines for the detected line segments. A line segment is defined by a pair of end points and a line segment is a segment of a straight line. In one embodiment, the line detection module 222 uses Hough transform for line segments detection. The Hough transform algorithm transforms between the Cartesian space and a parameter space in which a straight line can be defined. The advantage of the Hough transform is that the pixels lying on one straight line need not all be contiguous. This can be useful when trying to detect straight lines with short breaks in them due to noise, or when objects are partially occluded. In other embodiments, the line detection module 222 may uses variations of the Hough transform for line segment detection.

In step 310, the line detection module 222 also solves a line fitting problem based on the detected line segments. In one embodiment, the line detection module 222 uses a least absolute differences (also known as $L_1$ norm) technique to find the best line that fits the points in the detected line segments. In step 312, the line detection module 222 filters out line duplicates in the image Conventional systems rely on using finite line segments for structure and motion estimation. However, structure and motion estimation based on finite line segments has the drawback that limits the quality of 3D structure reconstruction due to unreliable determination of end points of the line segments. The unreliable determination of the end points, for example, of occluded line segments, often leads to poor quality of 3D structure reconstruction from line correspondences across multiple views. In contrast, the line detection module 222 detects lines across multiple image frames captured temporally, and is capable of allowing a camera motion system to use the finite end points of line segments and/or to use points between the end points of line segments. Using lines to estimate camera motion advantageously provides camera motion estimation efficiency and accuracy.

FIG. 4 is a flow chart of line detection by the line detection module 224 according to anther embodiment of the invention. Initially, the line detection module 224 performs 402 stereo rectification on images captured by the calibrated cameras 110a-b. In step 404, the line detection module 222 detects edges in the captured image using edge detection filters, such as a Sobel edge filter. In step 406, the line detection module 222 applies non-maximal suppression to build an edge map of the image being processed by accurately locating the peak/ridge location of both strong and weak edges. The stereo rectification (step 402), edge detection (step 404) and non-maximal suppression (step 406) are similar to the corresponding operations illustrated in FIG. 3.

As described above with reference to FIG. 3, the line detection module 222 detects straight lines using line detection algorithms such as the Hough transform or its variants. Although the Hough transform is useful for detecting straight lines with short breaks in them due to noise, the Hough transform can give misleading results when objects happen to be aligned by chance. The misleading results from the Hough transform and its variants are worse in complex indoor scenes.

In this embodiment, the line detection module 222 in FIG. 4 divides 408 the edge map into small cells. In one embodiment, the line detection module 222 divides the edge map into small 8×8-pixel cells. In step 410, the line detection module 222 detects edge blobs in each small cell. To decide if an edge blob is likely to be a line segment, the line detection module 222 builds a convex hull of the points in the edge blob and checks the thickness of the edge blob. The thickness of an edge blob is approximated by its area divided by the distance between two farthest points in the blob. In step 414, the line detection module 222 checks the alignment of each blob. Specifically, the line detection module 222 maintains the convex hull and the mean and covariance of the point coordinates for each line segment. When two line segments are merged, the point coordinates information such as the convex hulls for each line segment can be combined without having to refer to the original points in the line segments.

In step 414, the line detection module 222 incrementally merges small cells into larger cells. In one embodiment, the line detection module 222 merges multiple 8×8-pixel cells into a next-level cell that contains four 8×8-pixel cells. In the next-level cell, pairs of line segments with similar line directions are merged if the thickness of the combined convex hull is within a threshold, and this process is repeated until the last level cell coves the entire frame. The threshold is a design choice based on the line detection module 222 implementation.

In one embodiment, low-level image processing steps, including image rectification, Sobel edge detection, non-maximal suppression, stereo matching and multi-level optical flow operation can be implemented using a fast central processing unit (CPU). To speed up processing performance, in another embodiment, the low-level image processing steps can be implemented using a parallel computing architecture such as compute unified device architecture (CUDA) on a graphic processing unit (GPU).

Geometry of Structure and Motion Problem

Figure 5A:
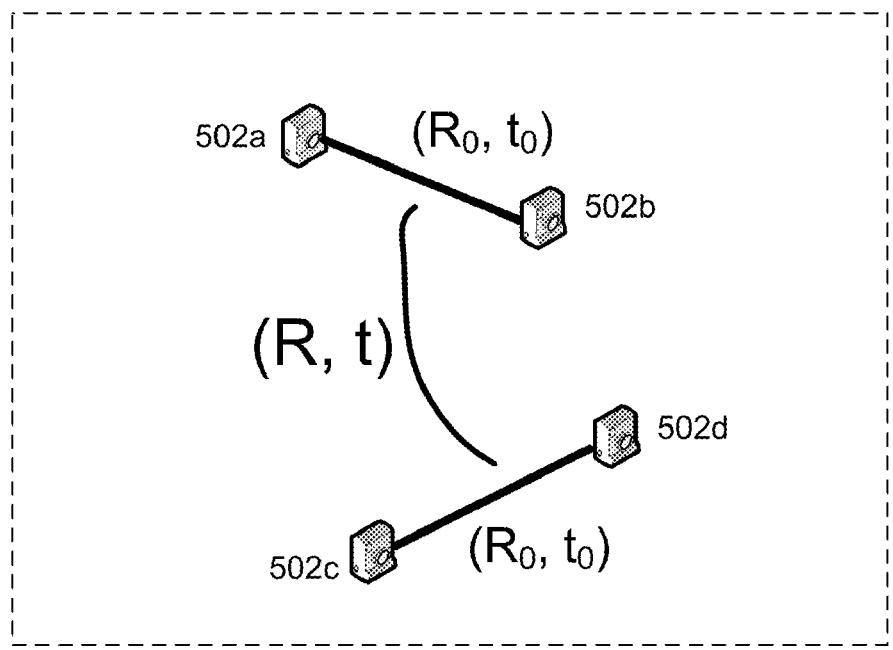
FIG. 5A is a stereo pair of cameras and its configuration for structure and motion estimation according to one embodiment of the invention.
Figure 5B:
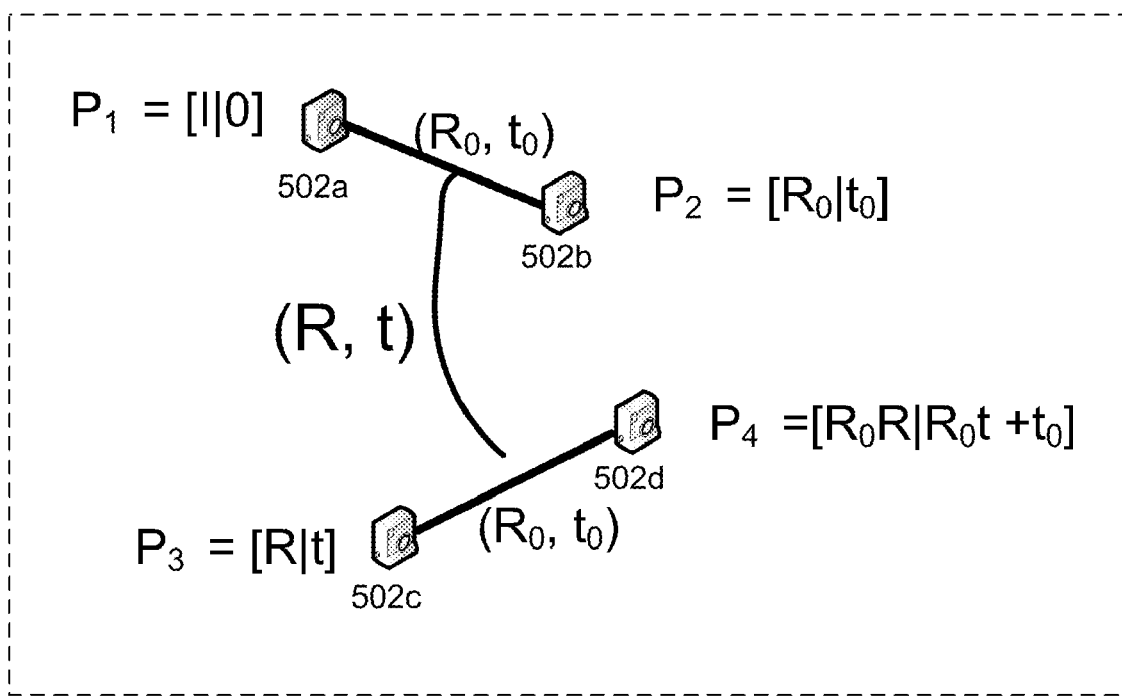
FIG. 5B is a parameterized stereo pair of cameras corresponding to the calibrated stereo pair illustrated in FIG. 5A for structure and motion estimation according to one embodiment of the invention.
Figure 6:
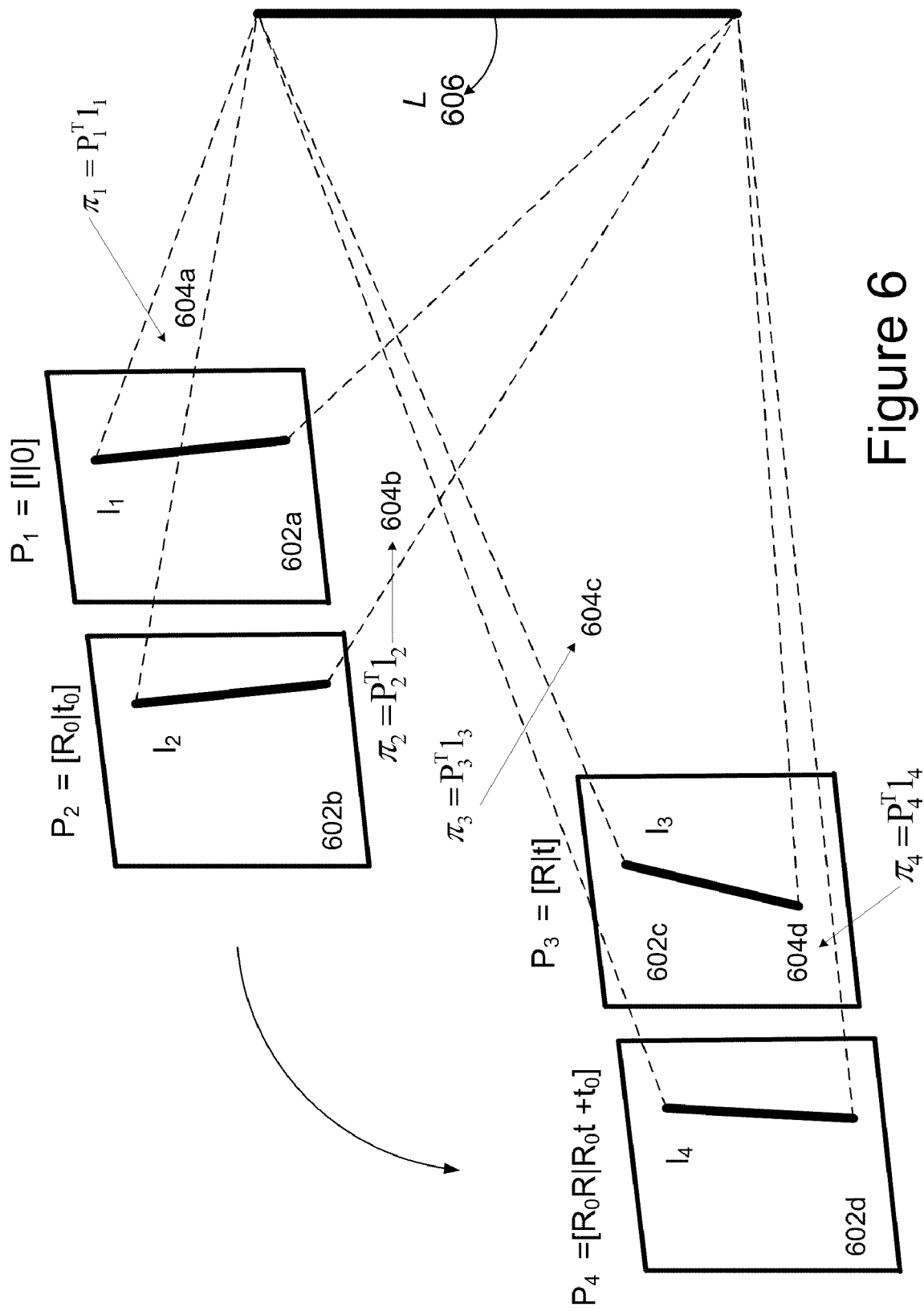
FIG. 6 illustrates the geometry of the stereo and motion estimation problem according to one embodiment of the invention.

Now referring to FIGS. 5A, 5B and FIG. 6, FIG. 5A, FIG. 5B and FIG. 6 are described below to illustrate the geometry of the structure and motion problem and its solutions. Unless stated otherwise, 3D points in the invention described herein and through the entire specification are denoted as homogeneous column vectors $X \in \mathbb{R}^4$ and 2D image points as homogeneous column vectors $x \in \mathbb{R}^3$. The perspective camera matrix is represented by a 3×4 matrix $P=K[R|t]$, where K is the 3×3 upper triangular matrix that encodes the internal parameters of a camera and (R, t) represents the exterior orientation. The commonly used projective geometry and 3D line geometry are readily known to those of ordinary skills within the scope of the invention.

Turning now to individual elements of FIG. 5A, FIG. 5A illustrates a stereo pair of cameras and its configuration for structure and motion estimation according to one embodiment of the invention. The stereo pair in FIG. 5A comprises a pair of calibrated cameras, a left camera 502a and a right camera 502b. The calibration parameters of the calibrated cameras 502a-b, such as the rotation matrix $R_0$ and the translation vector $t_0$, are known. The camera pair 502c-d represents a stereo pair related by a rigid body motion (R, t) of the stereo pair of cameras 502a-b.

FIG. 5B is a parameterized stereo pair of cameras corresponding to the calibrated stereo pair illustrated in FIG. 5A for structure and motion estimation according to one embodiment of the invention. Assuming the intrinsic parameter matrices, K, between the cameras 502a-b being identity (i.e., K=I), the left and right stereo cameras 502a-b can be parameterized as $P_1=[I|0]$ and $P_2=[R_0|t_0]$, where $R_0$ is a known rotation matrix and $t_0$ is a known translation vector. Then, the camera matrices in a stereo pair 502c-d related by a rigid body motion (R, t) are given by $P_3=[R|t]$ and $P_4=[R_0R|R_0t+t_0]$, respectively. The problem of motion estimation of the stereo pair 502a-b is reduced to determining the 6-dof transformation (R, t) from the coordinate frame of the stereo pair 502a-b to that of the stereo pair 502c-d.

FIG. 6 illustrates the geometry of the stereo and motion estimation problem according to one embodiment of the invention. FIG. 6 illustrates four back-projected planes 604a-d through the camera centers of the parameterized cameras $P_1$, $P_2$, $P_3$, and $P_4$ and each back-projected plane 604 contains a 3D line L 606. Generally, the back-projected plane of a 3D line L imaged as a 2D line l by a camera P is given by $\pi=P^T l$. In the embodiment illustrated in FIG. 6, the back-projected plane 604a is given by $\pi_1=P_1^T l_1$ and contains the 3D line L 606 imaged as the 2D line $l_1$ by the cameras $P_1$. Similarly, the back-projected plane 604b is given by $\pi_2=P_2^T l_2$ and contains the 3D line L 606 imaged as the 2D line $l_2$ by the cameras $P_2$. The back-projected plane 604c is given by $\pi_3=P_3^T l_3$ and contains the 3D line L 606 imaged as the 2D line $l_3$ by the cameras $P_3$. The back-projected plane 604d is given by $\pi_4=P_4^T l_4$ and contains the 3D line L 606 imaged as the 2D line $l_4$ by the cameras $P_4$.

Theoretically, if four 2D lines imaged by two stereo pairs of cameras correspond to a same 3D line, the back-projected planes through the camera centers of the cameras containing the 2D lines would correspond to a straight line, i.e., the 3D line imaged by the two camera stereo pairs. Taking FIG. 6 configuration as an example, if the four lines $l_1$, $l_2$, $l_3$ and $l_4$ imaged by the parameterized cameras $P_1$, $P_2$, $P_3$ and $P_4$ actually correspond to a same 3D line L, the four back-projected planes 604a-d would intersect in a straight line, e.g., the 3D line L 606. The four back-projected planes 604a-d, stacked row-wise, form a 4×4 matrix which is the primary geometric object of the structure and motion problem solved by the structure motion module 228:

$$W = \begin{bmatrix} \pi_1^T \\ \pi_2^T \\ \pi_3^T \\ \pi_4^T \end{bmatrix} = \begin{bmatrix} 1_1^T & 0 \\ 1_2^T R_0 & 1_2^T t_0 \\ 1_3^T R & 1_3^T t \\ 1_4^T (R_0 R) & 1_4^T (R_0 t + t_0) \end{bmatrix} \quad (1)$$

A point X that lies on a plane $\pi$ needs to satisfy the equation $\pi^T X=0$. Since the four back-projected planes 604a-d intersect in a straight line (i.e., the 3D line L 606), there are two independent points $X_1$ and $X_2$ of the straight line that satisfy $\pi_i^T X_j=0$, for i=1, 2, 3, 4 and j=1, 2, and $W^T X=0$. Thus, the matrix W has a 2D null-space, or has rank 2, when the lines $l_1$, $l_2$, $l_3$ and $l_4$ in the four back-projected images 604a-d correspond.

Simple Solution

Since the structure and motion system 10 uses calibrated stereo cameras, a first approach to the structure and motion problem is a simple multi-step reconstruction and alignment approach to reconstruct 3D lines. There are several embodiments to achieve this. In one embodiment, the structure and motion module 228 reconstructs the 3D lines in the frame of each stereo pair by intersecting the planes obtained by back-projection of each corresponding pair of 2D lines. The structure and motion module 228 computes the rotation that aligns the 3D lines, for example, by first aligning the mean directions of the 3D lines and then computing the residual in-plane rotation. The structure and motion module 228 computes the translation by aligning the points that lie midway between the 3D lines in the two rotationally aligned frames.

The attractions of the above simple solution are that they are simple and geometrically intuitive. However, the quality of 3D structure reconstruction obtained from such methods is dependent on the accuracy of reconstructed 3D lines, which is known to be quite poor for the practically important case of narrow baseline stereo. Moreover, if some scene lines lie close to the epipolar plane, such strategies are subjected to break down. What needed are stereo-based line reconstruction algorithms that look beyond the simple multi-step reconstruction and alignment in real-world scenes.

Linear Solution

Referring back to the geometric object of the structure and motion problem described in equation (1), asserting that W has rank 2 is equivalent to demanding that each of its 3×3 sub-determinants has rank 2, which amounts to four independent constraints. One way to extract these constraints is to perform two steps of Gauss-Jordan elimination (using Householder rotations) on the matrix $W^T$, to get a system of the form $$W_{gj} = \begin{bmatrix} \times & 0 & 0 & 0 \\ \times & \times & 0 & 0 \\ \times & \times & f_1(R,t) & f_2(R,t) \\ \times & \times & f_3(R,t) & f_4(R,t) \end{bmatrix} \quad (2)$$

where $f_i(R, t)$ are affine functions of R and t. Since rank of a matrix is preserved by elementary operations, the matrix $W_{gj}$ must also be rank 2 and thus, its third and fourth rows are linear combinations of the first two. It easily follows that:

$$f_i(R,t)=0, i=1, 2, 3, 4 \quad (3)$$

Thus, for $n \geq 3$, a linear estimate for the motion can be obtained as a solution to a 4n×12 system of the form Av=b, formed by stacking up the linear constraints $f_i$ where $v=[r_1^T, r_2^T, r_3^T t]^T$ and $r_1$, $r_2$, $r_3$ are columns of the rotation matrix R.

A linear solution to the structure and motion problem, such as direct linear transform for estimating the matrix W using eight points, suffers in the presence of noise. In particular, since orthonormality constraints have been ignored, the linear solution can be arbitrarily far from a rigid body motion.

Polynomial Solution

In the frequently encountered cases of narrow baseline stereos with nearly parallel camera principal axes, an additional drawback with the liner solution to the structure and motion problem is that a matrix A is close to rank-deficient, which makes its inversion unstable. A more practical approach is to work with a low-rank projection of A, that is, assume the solution lies in the space spanned by the last k singular vectors of [A, −b]. While more complex than the prior methods, the following polynomial solution has the advantage of being able to impose orthonormality for general camera motions.

The desired solution is expressed as a linear combination of the singular vectors of A, defined as $v_i$:

$$\begin{bmatrix} r_1 \\ r_2 \\ r_3 \\ t \\ 1 \end{bmatrix} = x_1 \begin{bmatrix} | \\ | \\ v_1 \\ | \\ | \end{bmatrix} + \ldots + x_k \begin{bmatrix} | \\ | \\ v_k \\ | \\ | \end{bmatrix} \quad (4)$$

and the structure and motion problem reduces to determining the coefficients $x_1, \ldots, x_k$ of the above linear combination, subject to orthonormality conditions:

$$\|r_1\|^2=1, \|r_2\|^2=1, \|r_3\|^2=1 \quad (5)$$

$$r_1^T r_2=0, r_2^T r_3=0, r_3^T r_1=0. \quad (6)$$

Substituting for (R, t) from equations (4) in (5) and (6), six polynomials of degree 2 in the k variables $x_1, \ldots, x_k$ are obtained. This system of polynomial equations has no solution in the general noisy case and it can be resorted to a principled "least-squares" approach to extract the solution.

In general, greater numerical precision and speed can be obtained by reducing the degree of a system of polynomial equations and the number of variables. In one embodiment, the structure and motion module 228 drops the scale of the system of polynomial equations. Specifically, the structure and motion module 228 divides each equation in (4) by $x_k$ and replace the unit norm constraints in (5) by equal norm constraints:

$$\|r_1\|^2 - \|r_2\|^2 = 0, \|r_2\|^2 - \|r_3\|^2 = 0. \tag{7}$$

Now, the five polynomials in (7) and (6) have k−1 variables each, defined as $q_i(x_i, \ldots, x_{k-1})$, for i=1, ..., 5. Then, the corresponding reduced least squares problem is to minimize $q(x_1, \ldots, x_{k-1}) = \sum_{i=1}^{5} q_i^2(x_1, \ldots, x_{k-1})$. Other embodiments may extend the above solution for different scale configurations, such as fixed scale.

In one embodiment, for ease of exposition, assuming k=4, but the following solution can be easily extended for other number of variables in other embodiments. Then, each of the five polynomial equations consists of the ten monomials $\lfloor x_1^2, x_2^2, x_1 x_2, x_1, x_2, x_1 x_3, x_2 x_3, x_3^2, x_3, 1 \rfloor$. Since relatively low degree polynomials in a single variable can be solved very fast using methods like Sturm sequences, the structure motion module 228 attempts to solve for a single variable first, for example, $x_3$. Then, each of the polynomials $q_i(x_1, x_2, x_3)$ can be rewritten as $$c_1 x_1^2 + c_2 x_2^2 + c_3 x_1 x_2 + [1] x_1 + [1] x_2 + [2] = 0 \tag{8}$$

where the notation [n] denotes some polynomial of degree n in the single variable $x_3$. The system of polynomials, written out in a matrix format, now has the form $$\begin{bmatrix} c_1 & c_2 & c_3 & [1] & [1] & [2] \\ c_1' & c_2' & c_3' & [1] & [1] & [2] \\ c_1'' & c_2'' & c_3'' & [1] & [1] & [2] \\ c_1''' & c_2''' & c_3''' & [1] & [1] & [2] \\ c_1'''' & c_2'''' & c_3'''' & [1] & [1] & [2] \end{bmatrix} \begin{bmatrix} x_1^2 \\ x_2^2 \\ x_1 x_2 \\ x_1 \\ x_2 \\ 1 \end{bmatrix} = \begin{bmatrix} 0 \\ 0 \\ 0 \\ 0 \\ 0 \end{bmatrix}. \tag{9}$$

Let the 5×6 matrix above be denoted as G. Then, the i-th component of its null-vector, denoted as $u = [x_1^2, x_2^2, x_1 x_2, x_1, x_2, 1]^T$ can be obtained as $$u_i = (-1)^{i-1} \det(\hat{G}_i) \tag{10}$$

where $\hat{G}_i$ stands for the 5×5 matrix obtained by deleting the i-th column of G. Thus, the vector u can be obtained, up to scale, with each of its components a polynomial of degree $4(x_1^2, x_2^2, x_1 x_2)$, $3(x_1, x_2)$, or $2(1)$ in the single variable $x_3$.

To compute the determinants of the 5×5 sub-matrices of G, it is important to carefully design the computation of these determinants because the number of arithmetic operations can explode very quickly, which might adversely affect the numerical behavior of the polynomial solution.

In one embodiment, to compute the polynomial corresponding to $u_1$ in (10), consider the matrix $G'_1$, which is $\hat{G}_1$ with the column order reversed. Then, $\det(G'_1{}^T) = \det(\hat{G}_1)$. Each of the lower 4×4 sub-determinants of $G'_1{}^T$ is a polynomial of degree 2. It now requires relatively little book-keeping to determine the coefficients of $z^4, \ldots, z^0$ in $u_1$ by appropriately convolving the coefficients of degree 2 polynomials in the first row of $G'_1{}^T$ with those from its lower 4×4 sub-determinants. The symbolic interactions of the coefficients are pre-computed and only need to be evaluated for values of $v_1, \ldots, v_4$. Similar steps can be taken to compute the coefficients of various powers of z in $u_2, \ldots, u_6$.

It is noted that all the components of the vector u are not independent. In fact, in the noiseless case, the components of the vector u needs to satisfy the following three constraints:

$$[u_4 u_5 = u_3 u_6]: \quad (x_1) \times (x_2) = (x_1 x_2) \times (1) \tag{11}$$

$$[u_4^2 = u_1 u_6]: \quad (x_1) \times (x_1) = (x_1^2) \times (1)$$

$$[u_5^2 = u_2 u_6]: \quad (x_2) \times (x_2) = (x_2^2) \times (1)$$

Substituting the expressions for u obtained from equation (10), the structure and motion module 228 obtains three polynomials of degree 6 in the single variable $x_3$. These polynomials are denoted as $p_i(x_3)$, i=1, 2, 3. Then, the structure and motion module 228 has a system of three univariate polynomials that need to be solved in a "least-squares" sense. The structure and motion module 228 approaches this as an unconstrained optimization problem $$\min_{x_3} p_1^2(x_3) + p_2^2(x_3) + p_3^2(x_3). \tag{12}$$

At the minimum, the first-order derivative of the above objective function needs to vanish, so the optimal $x_3$ is a root of the polynomial $$p(x_3) = p_1(x_3) p'_1(x_3) + p_2(x_3) p'_2(x_3) + p_3(x_3) p'_3(x_3). \tag{13}$$

Note that $p(x_3)$ is a degree 11 univariate polynomial, whose roots can be determined very fast in practice. There can be up to 11 real roots of $p(x_3)$, all of which needs to be tested as a candidate solution. Also noted is that the odd degree of $p(x_3)$ guarantees at least one real solution.

Finally, once the candidates for $x_3$ have been obtained, the corresponding candidates for $x_1$ and $x_2$ are obtained by substituting the value of $x_3$ in the expression for u and by reading off the values of $$x_1 = \frac{u_4}{u_6} \text{ and } x_2 = \frac{u_5}{u_6}.$$

The rotation and translation can now be recovered, up to a common scale factor, by substituting in equation (4). In another embodiment, the structure and motion module 228 fixes the scale of the system of polynomial equations by fixing the determinant of R to 1.

Incremental Solution

Structure and motion problems are often encountered in high frame-rate video sequences. For a high frame-rate video sequence, it is reasonable to assume that the motion between subsequent frames is very small. Small displacements along the manifold of the rotation matrices described above can be approximated by those along a tangent space, which is the manifold of skew-symmetric matrices. For example, the rotation matrices estimates lie on the SO(3) manifold, the incremental displacement along the manifold can be approximated by that along its tangent space, which is the so(3) manifold of 3×3 skew-symmetric matrices. The incremental rotation R can be parameterized as $R \approx I+[s]_x$, where $x \in \mathbb{R}^3$ as the following:

$$R = \begin{bmatrix} 1 & s_1 & s_2 \\ -s_1 & 1 & s_3 \\ -s_2 & -s_3 & 1 \end{bmatrix}$$

Now, n lines give 8n linear $R \approx I+[s]_x$ constraints of the form equation (3) on the 6 unknowns ($s_1$, $s_2$, $s_3$, t), which can be estimated using a singular value decomposition.

To provide fast and robust structure and motion estimation, the structure and motion system exploits knowledge of stereo pair parameters and uses straight lines as features. The fast and robust structure and motion estimation solutions described above use minimum number of lines to fix the six degrees of freedom of the motion of a stereo pair. For example, in one embodiment, the polynomial and incremental solutions to the structure and motion problem can work with just two lines. For the linear solution, the structure and motion system can work with three lines. Using few lines for the structure and motion estimation can be advantageously used in a real-time system which requires fast and efficient solutions. Other embodiments may use more lines to enhance the robustness of structure and motion estimation.

Applications

To quantify the performance of the various solutions to the structure and motion problem, such as the simple solution, the incremental solution and the polynomial solution described above, the various solutions are applied to both synthetic data and real world data with various noise levels and camera motions. In one embodiment, the first stereo pair of cameras can be randomly generated with known random camera configurations and line geometries and the second stereo pair is displaced with a random motion to be estimated. The synthetic data comprises lines randomly generated in a synthetic cube. The camera motion is kept small. To observe the simulation performance of various structure and motion estimation solutions with synthetic data, noise of varying standard deviations is added to the coordinates of the 2D lines in each view. In one embodiment, the noise is zero mean Gaussian noise. Without added noise, all structure and motion estimation solutions with the synthetic data perform perfectly without estimation error.

The estimation error is classified in two groups: rotation error and translation error. The rotation error estimated by a structure and motion solution (e.g., a simple solution, a polynomial solution and the incremental solution) is compared with the rotation data (i.e., the known ground-truth values) actually observed from the camera motion being estimated. Similarly, the translation error estimated by a structure and motion solution is also compared with the known ground-truth translation values actually observed from the camera motion being estimated.

Figure 7A:
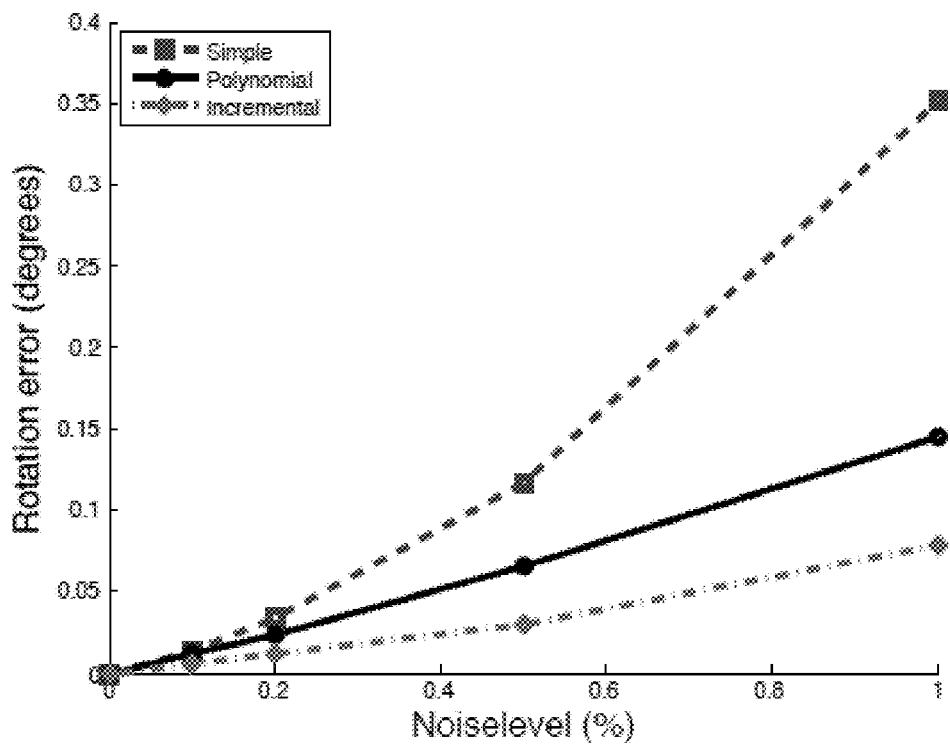
FIG. 7A illustrates a comparison of rotation errors among different solutions using two lines for synthetic data with various noise levels according to one embodiment of the invention.

FIG. 7A illustrates a comparison of rotation errors among different solutions using two lines for synthetic data with various noise levels according to one embodiment of the invention. The simple solution, the incremental solution and the polynomial solution, each using the minimum two lines and lower quartile of error distributions, are applied to the synthetic data.

In FIG. 7A, the rotation error of using the simple solution is represented by the dotted-line, the rotation error of using the polynomial solution by the straight line and the rotation error of using the incremental solution by the dot-dash line. It can be seen that the incremental and polynomial solutions yield lower errors than the simple solution. It can also been seen that with increase of noise levels, the rotation errors of all three solutions increase, but with larger amount of increase from the simple solution.

Figure 7B:
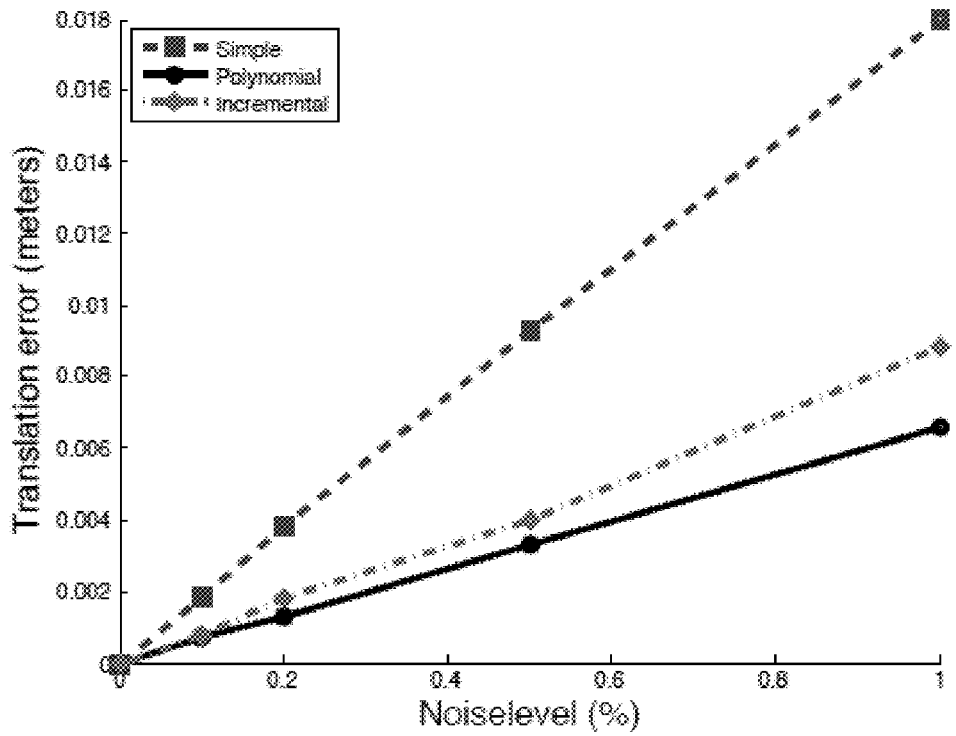
FIG. 7B illustrates a comparison of translation errors among different solutions using two lines for synthetic data with various noise levels according to one embodiment of the invention.

FIG. 7B illustrates a comparison of translation errors among different solutions using two lines for synthetic data with various noise levels according to one embodiment of the invention. It can be seen that the incremental and polynomial solutions yield lower errors than the simple solution. It can also been seen that with increase of noise levels, the rotation errors of all three solutions increase, but with larger amount of increase from the simple solution.

Figure 7C:
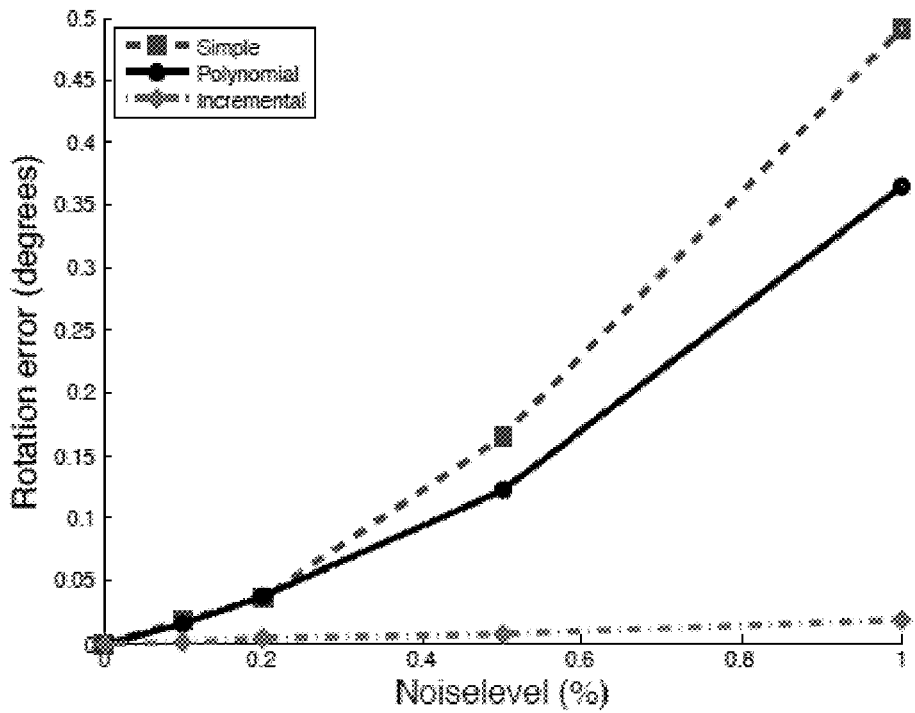
FIG. 7C illustrates a comparison of rotation errors among different solutions using three lines for synthetic data with various noise levels according to one embodiment of the invention.
Figure 7D:
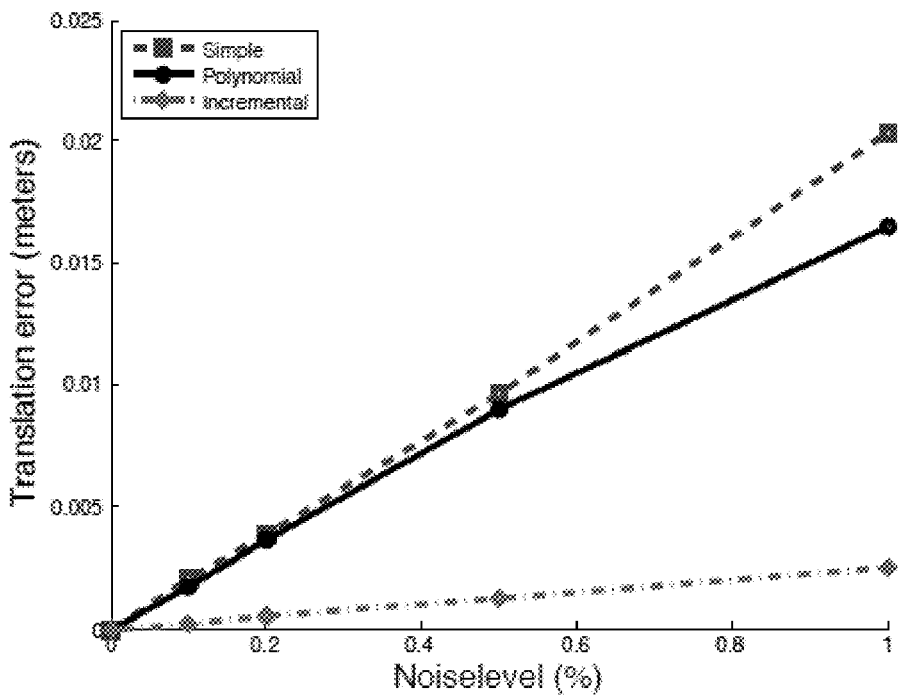
FIG. 7D illustrates a comparison of translation errors among different solutions using three lines for synthetic data with various noise levels according to one embodiment of the invention.

In the second set of experiments with synthetic data for small camera motion, the performances of each of the solutions (e.g., the simple solution, the polynomial solution and the incremental solution) are evaluated using three lines. FIG. 7C illustrates a comparison of rotation errors among different solutions using three lines for synthetic data with various noise levels according to one embodiment of the invention. FIG. 7D illustrates a comparison of translation errors among different solutions using three lines for synthetic data with various noise levels according to one embodiment of the invention. It can be seen that the incremental and polynomial solutions yield lower errors than the simple solution with the incremental solution having the smallest errors among the three solutions. Using three lines results in added robustness to the structure and motion estimation solutions described above with still relatively inexpensive computation cost.

To simulate real world situation for camera motion estimation and 3D line reconstruction, the structure and motion solutions are applied to real world data in real world environment such as indoor office environment. In one embodiment, the image sequences for the simulations are acquired using a stereo pair with baseline 7.4 cm, with 640×360-pixel resolution and a wide field-of-view of 110°×80° for each camera. The simulations are conducted in a Random Sample Consensus (RANSAC) framework, where the structure and motion estimation can be optionally refined by a within-frame, non-linear local refinement procedure using all inliers. No refinement of structure and motion technique, such as bundle adjustment over multiple frames, is used in the simulations.

FIGS. 8A-8F illustrate structure and motion estimation experimental results for a turntable video sequence according to one embodiment of the invention. The visual input data in the experiments is obtained by imaging a set of boxes rotating on a turntable. The obtained dataset is interesting because there are very few straight lines for estimation, with some outliers in a form of background lines that do not move with the turntable. The ground truth rotation of the turntable is slightly more than 360°. The frame rate used in the experiments is 15 frames-per-second (fps).

Figure 8A:
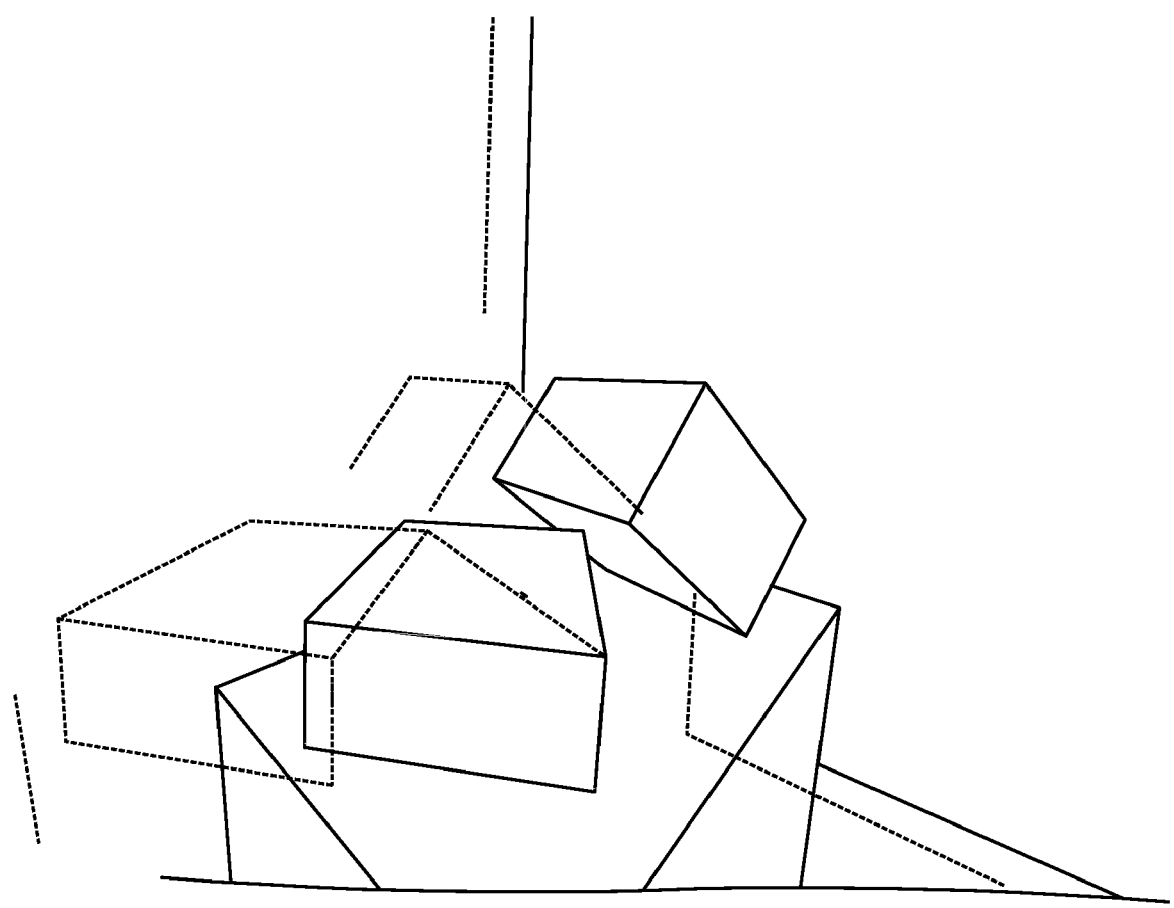
Figure 8C:
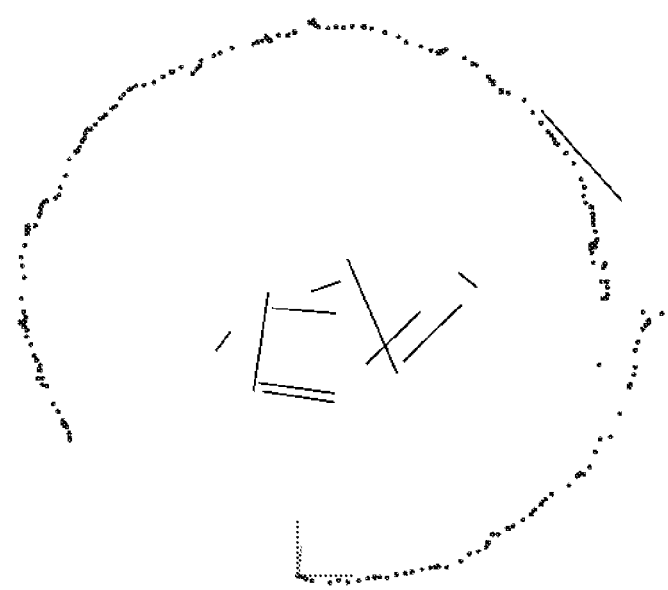
Figure 8C:
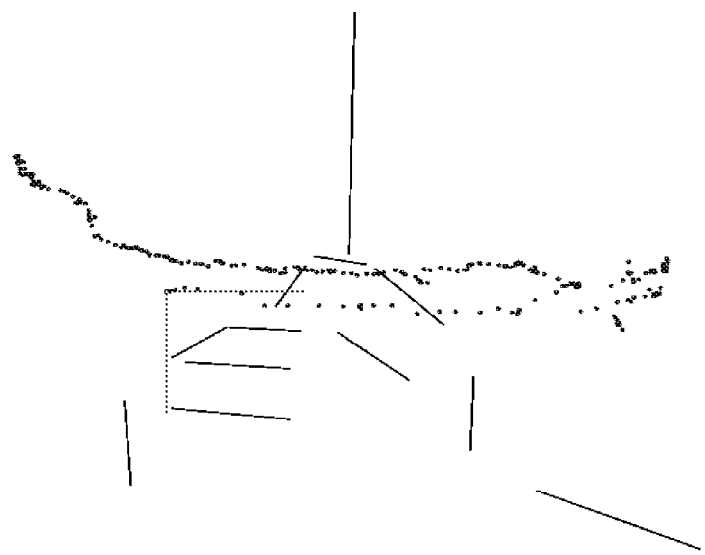
Figure 8F:
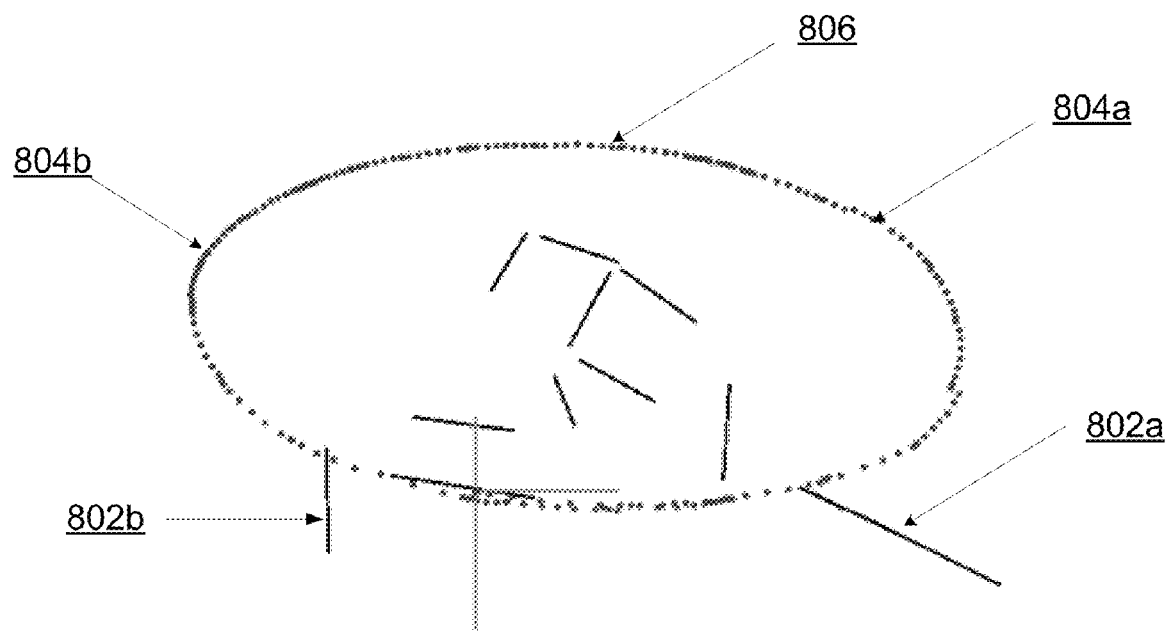

FIG. 8A illustrates the last frame of the turntable video sequence overlaid with multiple lines and FIG. 8F is the corresponding last frame of the turntable video sequence with reconstructed 3D lines and estimated camera motion. The solid lines 802 (e.g., 802a and 802b) in FIG. 8F represent the reconstructed 3D lines of the last frame, which correspond to the lines of the last frame in FIG. 8A. The dots 804 (e.g., 804a and 804b) represent the camera positions at different times capturing the turntable video sequence. The circle-like shape 806 indicates the estimated camera motion by a structure and motion solution.

FIG. 8C and FIG. 8D illustrate the experimental results (a top-view and a side-view) of using 3-line simple solution with the turntable video sequence. It can be seen that the output of the simple solution is jerky and does not yield a complete circle (FIG. 8C), even after nonlinear refinement (FIG. 8D).

On the other hand, the 3-line incremental solution and the polynomial solution yield fairly good reconstructions without any refinement, but almost perfect results with nonlinear refinement. Specifically, FIG. 8B illustrates the top and side-view of the reconstructed 3D lines and camera motions using the 3-line incremental structure and motion solution in the RANSAC framework without any refinement applied to the estimated motion. FIG. 8B represents the top view of the reconstructed 3D lines and camera motions using the 3-line incremental structure and motion solution in the RANSAC framework with nonlinear refinement. Comparing the results in FIG. 8C and FIG. 8D, the reconstructed 3D lines and camera motions using the 3-line incremental structure and motion solution with motion estimation refinement is almost perfect. The effect of refinement is further illustrated in FIG. 8E, which shows the experimental result of using a 3-line polynomial solution in the RANSAC framework and a within-frame refinement.

To provide fast and robust motion estimation and structure reconstruction, a structure and motion system exploits the known camera parameters of a stereo pair with straight lines. By using lines rather than traditional line segments, the structure and motion system avoids the issues due to uncertain determination of end points of a line segment. Using a few (two or three) lines by the structure and motion system provides a suitable structure and motion solution in real-time systems. The disclosed reconstruction system has a wide range application to real world problems, such as application in robotics and automative systems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer implemented method for estimating camera motion and structure reconstruction of a scene, the method comprising:
   receiving visual input data captured by a stereo pair of cameras, the stereo pair of cameras being calibrated and the visual input data comprising a plurality of image frames;
   detecting lines in the received visual input data, wherein a line is a digital representation of a line in a digital representation of an image;
   finding line correspondences between the detected lines in the visual input data;
   tracking the detected lines temporally across the plurality of the image frames;
   estimating the camera motion using the detected lines in the visual input data comprising:
      parameterizing the stereo pair of cameras and a corresponding stereo pair of cameras, the corresponding stereo pair of cameras being related by camera motion and the camera motion being defined by rotation parameter and translation parameter;
      obtaining back-projected image planes through the camera centers of the parameterized stereo pair and parameterized corresponding stereo pair, a back-projected image plane containing a detected line in the visual input data and its corresponding three-dimensional line;
      presenting camera motion to be estimated in terms of the rotation parameter and translation parameter and parameters associated with the stereo pair of the cameras; and
      determining the rotation parameter and translation parameter using the detected lines in the visual input data; and
   reconstructing three-dimensional lines from the estimated camera motion.

2. The method of claim 1, wherein detecting lines in the received input data comprises:
   detecting edges in the received input data using an edge detection means and generating corresponding edge images of the input data;
   building an edge map based on the edge images of the received input data;
   detecting edge blobs in the edge map;
   detecting line segments in the edge map based on the detected edge blobs and fitting lines for the detected line segments; and
   filtering out line duplicates of the fitted lines.

3. The method of claim 2, wherein the edge detection means is a Sobel edge filter.

4. The method of claim 2, wherein building the edge map comprises performing non-maximal suppression to the edge images of the received input data.

5. The method of claim 2, wherein detecting line segments comprises using a Hough transform with the edge map to detect line segments.

6. The method of claim 1, wherein detecting lines in the received input data further comprises:
   dividing an edge map into a plurality of small pixel cells, a small pixel cell comprising a plurality of image pixels of the input data;
   detecting edge blobs in each of the small pixel cells;
   checking alignments of edge blobs in the small pixel cells; and
   merging incrementally small pixel cells into a plurality of next-level pixel cells, a next-level pixel cell comprising multiple small pixel cells.

7. The method of claim 6, wherein the small pixel cell is a 8×8-pixel cell comprising 8×8 image pixels of the input data.

8. The method of claim 6, wherein the next-level pixel cell contains four 8×8-pixel cells.

9. The method of claim 1, wherein finding line correspondences between the detected lines in the visual input data comprising using dense stereo matching and a sum-of-absolute difference measure to establish the line correspondence.

10. The method of claim 1, wherein tracking the detected lines temporally across the plurality of the image frames comprises using a multi-level Lucas-Kanade optical flow with motion fields associated with each detected line.

11. A computer system for estimating camera motion and structure reconstruction of a scene using lines, the system comprising:
   an input receiving module configured to receive visual input data captured by a stereo pair of cameras, the stereo pair of cameras being calibrated and the visual input data comprising a plurality of image frames;
   a line detection module configured to detect lines in the received visual input data, wherein a line is a digital representation of a line in a digital representation of an image;

a line correspondence module configured to find line correspondences between the detected lines in the visual input data;

a temporal line tracking module configured to track the detected lines temporally across the plurality of the image frames; and a structure and motion module configured to:
  estimate the camera motion using the detected lines in the visual input data comprising:
    parameterizing the stereo pair of cameras and a corresponding stereo pair of cameras, the corresponding stereo pair of cameras being related by camera motion and the camera motion being defined by rotation parameter and translation parameter;
    obtaining back-projected image planes through the camera centers of the parameterized stereo pair and parameterized corresponding stereo pair, a back-projected image plane containing a detected line in the visual input data and its corresponding three-dimensional line;
    presenting camera motion to be estimated in terms of the rotation parameter and translation parameter and parameters associated with the stereo pair of the cameras; and
    determining the rotation parameter and translation parameter using the detected lines in the visual input data; and
  reconstruct three-dimensional lines from the estimated camera motion.

12. The system of claim 11, wherein the line detection module is further configured to:
  detect edges in the received input data using an edge detection means and generating corresponding edge images of the input data;
  build an edge map based on the edge images of the received input data;
  detect edge blobs in the edge map;
  detect line segments in the edge map based on the detected edge blobs and fitting lines for the detected line segments; and
  filter out line duplicates of the fitted lines.

13. The system of claim 12, wherein the edge detection means is a Sobel edge filter.

14. The system of claim 12, wherein building the edge map comprises performing non-maximal suppression to the edge images of the received input data.

15. The system of claim 12, wherein detecting line segments comprises using a Hough transform with the edge map to detect line segments.

16. The system of claim 11, wherein the line detection module is further configured to:
  divide an edge map into a plurality of small pixel cells, a small pixel cell comprising a plurality of image pixels of the input data;
  detect edge blobs in each of the small pixel cells;
  check alignments of edge blobs in the small pixel cells; and
  merge incrementally small pixel cells into a plurality of next-level pixel cells, a next-level pixel cell comprising multiple small pixel cells.

17. The system of claim 16, wherein the small pixel cell is a 8×8-pixel cell comprising 8×8 image pixels of the input data.

18. The system of claim 16, wherein the next-level pixel cell contains four 8×8-pixel cells.

19. The system of claim 11, wherein the line correspondence module is further configured to use dense stereo matching and a sum-of-absolute difference measure to establish the line correspondence.

20. The system of claim 11, wherein the temporal line tracking module is further configured to use a multi-level Lucas-Kanade optical flow with motion fields associated with each detected line.

* * * * *